July 18, 1939.   E. C. RANEY   2,166,322
REFRIGERATOR CONTROL SWITCH
Filed May 13, 1935   4 Sheets-Sheet 1
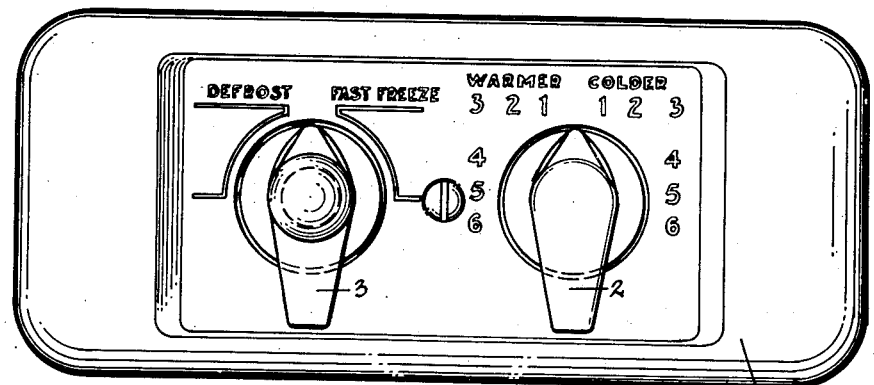
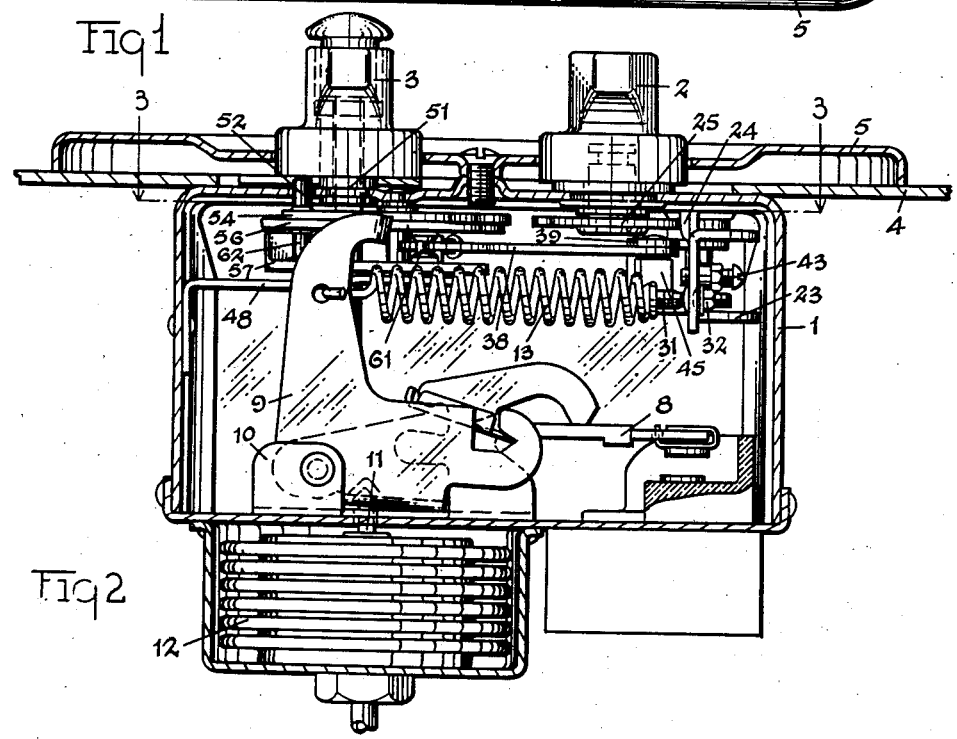
Inventor
Estel C. Raney
By Faust & Crampton
Attorney

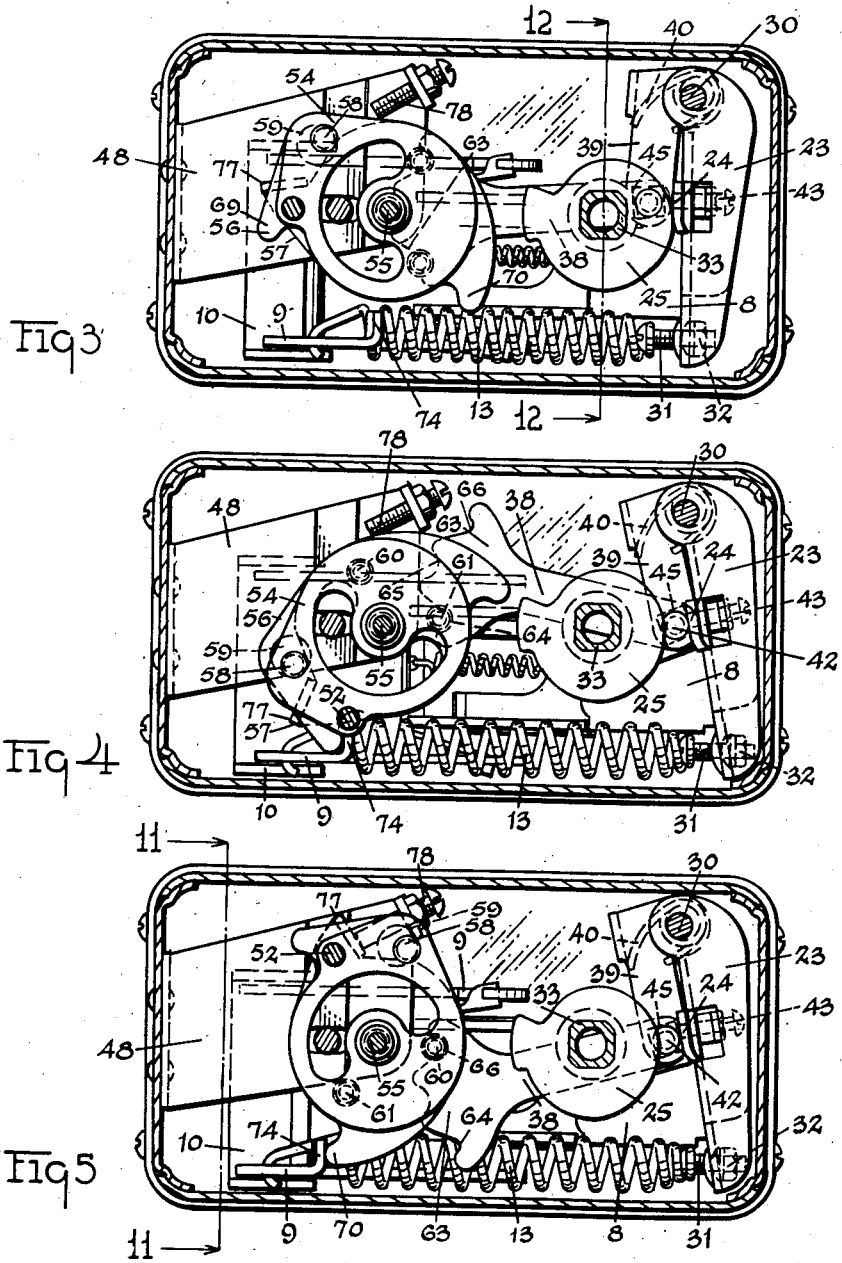

July 18, 1939.   E. C. RANEY   2,166,322
REFRIGERATOR CONTROL SWITCH
Filed May 13, 1935   4 Sheets-Sheet 3
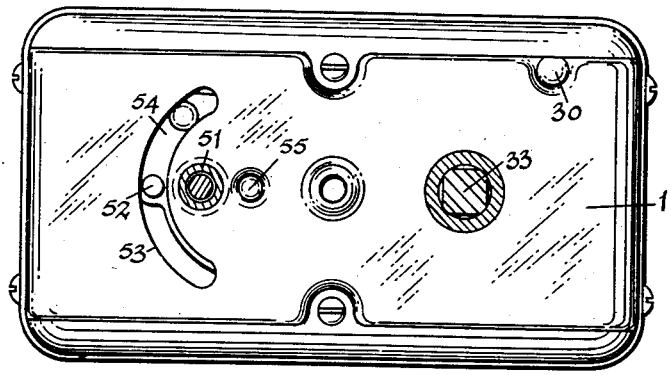
Fig 6
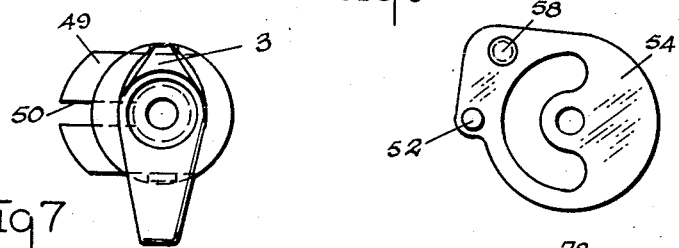
Fig 7   Fig 8
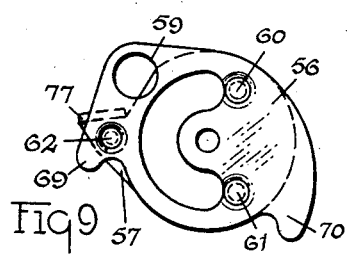
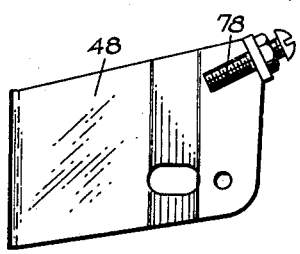
Fig 9   Fig 10
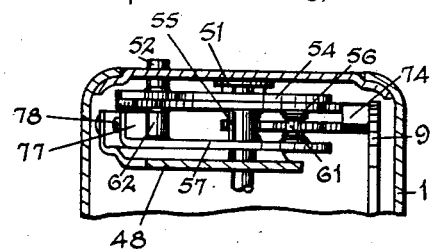
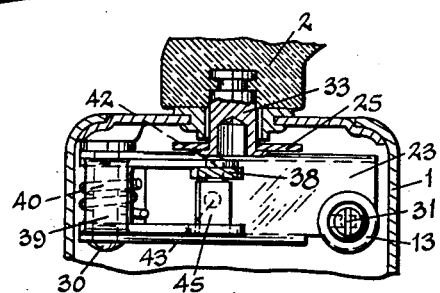
Fig 11   Fig 12
Inventor
Estel C. Raney
By Faust & Crampton
Attorney July 18, 1939.   E. C. RANEY   2,166,322
REFRIGERATOR CONTROL SWITCH
Filed May 13, 1935   4 Sheets-Sheet 4
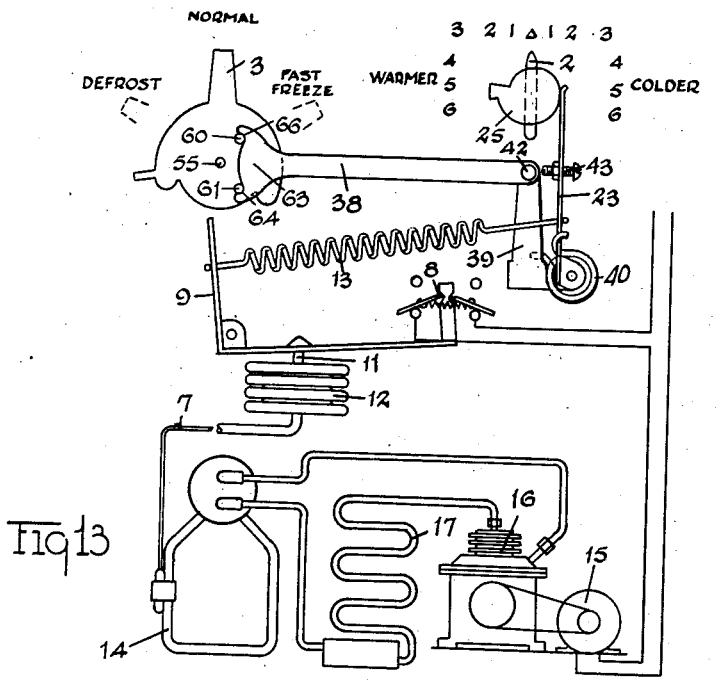
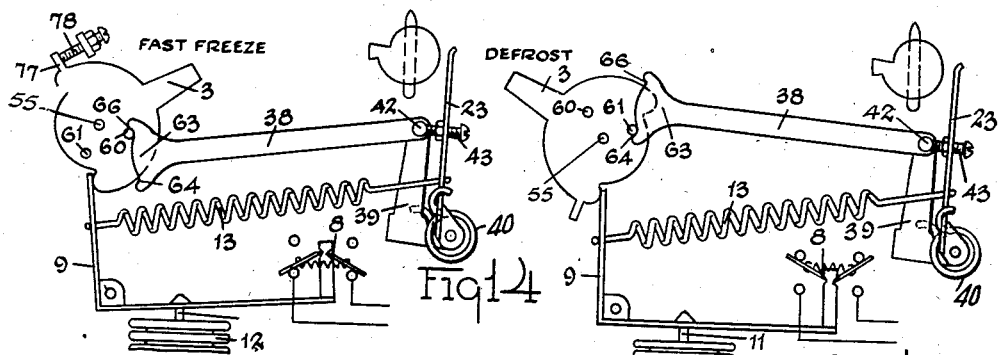
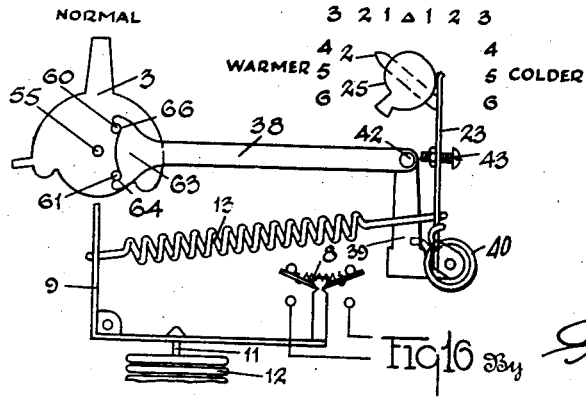
Inventor
Estel C. Raney
By
Attorney Patented July 18, 1939

2,166,322

UNITED STATES PATENT OFFICE 2,166,322

REFRIGERATOR CONTROL SWITCH

Estel C. Raney, Columbus, Ohio, assignor to Ranco Incorporated, Columbus, Ohio, a corporation of Ohio Application May 13, 1935, Serial No. 21,163

8 Claims. (Cl. 200—83)

My invention relates to a switch control means that enables adjustment and corresponding switch operation within a limited range and also ready modification of the control means to produce desired switch operations on either side of the range. The invention particularly relates to a refrigerator control switch which is particularly adapted for the control of refrigerators to produce normal refrigerating temperatures that may be adjustably selected within a desired range; and also to produce a predetermined high temperature above the adjustable range of temperatures and notwithstanding variations in the adjustment of the normal refrigerating temperatures, for defrosting of the chilling unit of the refrigerating apparatus; or to produce a predetermined, substantially fixed low or fast-freezing temperature below the said range of normal refrigerating temperatures notwithstanding variations of the normal refrigerating temperatures.

The invention particulary has for its object to provide a resilient member that counteracts a pressure-responsive element, and means for adjusting the spring to produce switch-opening and closing movements at desired pressures. The pressures that actuate the pressure-responsive element to control the operation of the switch may be produced by any device that is desired, such as by the pressure produced by change in temperature of a part of a system or device, by mechanical pressure changes, by fluid or pneumatic pressure changes, or by any pressure-producing factor or condition that may be used to control the switch and thus control the apparatus that produces the controlling factor or condition.

As is well known, most thermostatic control devices operate by expansion of an element against the tension or compression of a resilient member. In the form of construction commonly used in refrigerators, the thermostat consists of a bellows having a fluid that expands as the temperature of the fluid rises and a spring for counteracting the pressure of the fluid located within the bellows. A tube is connected to, or terminates in proximity with, the chilling unit for transmitting to the bellows pressure changes due to changes in pressure or temperature of the chilling unit. The changes in pressure of the fluid in the bellows correspond to changes in temperature of the chilling unit.

Also, as is well known in connection with thermostatic or pressure operated switches for controlling refrigerators, the pressure or temperature that causes switch-opening differs from that which causes switch-closing. Switch-closing is usually produced at a temperature or pressure above the switch-opening temperature or pressure, and the difference in the switch operating temperatures is referred to as the differential of the switch operations.

The switches now commonly used in refrigerators are opened when the bellows reaches a certain fixed volume and are closed when the bellows reaches another fixed volume. Usually the switch-opening volume of the bellows is less than the switch-closing volume. This differential is due largely to necessary mechanical structure to produce opposite movements of the movable contact of the switch and may be extended and regulated if desired. The switch-operating temperatures are regulated by varying the pressures at which the bellows reaches the fixed volumes which is brought about by regulating the counteracting pressure produced by the spring. The counteracting pressure of the spring thus determines the temperature at which the bellows reaches the switch-operating volumes. Thus, if the refrigerating apparatus is operating under a normal selected temperature obtained by the adjustment of the spring, and the pressure on the bellows is reduced, the bellows expands and operates to close the switch if it is open or hold the switch closed if it is closed and cause the motor to operate the compressor and draw the refrigerant gas from the chilling unit to produce rapid absorption of the heat from within the refrigerator and the fluid in the pipe connected to the bellows until the volume of the bellows reduces to the fixed switch-opening volume. If, on the other hand, the counteracting pressure of the spring is increased during the time that the refrigerating apparatus is operating within the normal range of temperature, the volume of the bellows is reduced, and the switch is opened if it is closed, and consequently the chilling unit will receive heat by conduction from the atmosphere that will raise the temperature of the chilling unit and raise the pressure in the pipe and bellows until the volume of the bellows reaches the switch-closing point.

By my invention I have provided means for adjusting the counteracting pressure of the spring on the bellows to produce normal refrigerating temperatures and a manually operable means for changing the counteracting pressure on the bellows and actuated by the spring, either to coact with the spring to increase the counteracting pressure of the bellows to produce a predetermined, substantially fixed defrosting temperature regardless of the adjustments to produce normal operating temperatures, or to counteract the pressure of the spring to reduce the counteracting pressure on the bellows and permit the bellows to expand to produce a predetermined, subsequently fixed temperature below the normal refrigerating temperature, such as a "fast-freezing" temperature, regardless of the adjustments that may be made to produce any of the normal operating temperatures, and to automatically restore the counteracting pressure that produces the normal temperatures when either the "fast-freezing" or defrosting switch-operating temperatures have been produced.

The invention may be contained in control switches of different forms and for controlling apparatus of different kinds. To illustrate a practical application of the invention, I have selected a structure containing the invention as an example of the switches that contain the invention and shall describe the particular refrigerating control switch selected hereinafter, it being understood that variations in details thereof may be made without departing from the spirit of the invention. The switch referred to is shown in the accompanying drawings.

Fig. 1 illustrates a top view of a shell containing the refrigerator control switch. Fig. 2 is a side view of the switch, the shell being shown in section. Fig. 3 is a view of a section taken on the plane of the line 3—3 indicated in Fig. 2. Fig. 4 is a view similar to that shown in Fig. 3 and shows parts in position for defrosting the chilling unit of the refrigerating apparatus. Fig. 5 is also a view similar to that shown in Fig. 3, the parts being shown in position for producing the fast-freezing temperature. Fig. 6 is a top view of a shell, the face plate and the indicating pointers being shown removed. Fig. 7 illustrates the top view of a pointer for selectively setting the mechanisms to produce either the defrosting or the fast-freezing temperature. Fig. 8 illustrates a view of a plate operated by one of the control pointers. Fig. 9 illustrates a top view of a pair of pin-connected plates. Fig. 10 illustrates a top view of a bracket located below the plates shown in Figs. 8 and 9. Fig. 11 illustrates a view of a section taken on the line 11—11 indicated in Fig. 5. Fig. 12 is a view of a section taken on the plane of the line 12—12 indicated in Fig. 3. Fig. 13 illustrates diagrammatically the relative positions of the parts of the switch and also illustrates diagrammatically the refrigerating system. Fig. 14 illustrates the relative position of the switch when the chilling unit is producing fast-freezing in the refrigerator. Fig. 15 illustrates the relative position when the switch is open to defrost the chilling unit. Fig. 16 illustrates the position of the parts when the adjusting member has been altered to produce a temperature other than that produced by the parts when in the position shown in Fig. 13.

The refrigerator control switch may be contained in the shell 1 and provided with manually operable control elements having the handles or pointers 2 and 3 whereby parts of the control switch may be adjusted or altered or set to produce desired temperature responses by the closing and opening movements of the switch. The shell 1 may be mounted by any suitable means on the baffle plate 4 of a refrigerator or on any other suitable supporting part of the refrigerator.

In the particular form of construction shown in the drawings the switch is provided with a face plate 5 through which the handles or pointers 2 and 3 of the control elements extend, and the face plate 5 is provided with suitable indicia for indicating relative positions of the control elements operated by the handles or pointers 2 and 3 and to signify the controlling conditions under which the switch is operating.

The switch 8 is a snap toggle switch of a type heretofore used and is operated by means of a lever 9 pivotally supported in a bracket 10 secured to a part of the shell 1. The lever 9 is engaged by a pin 11 secured in one end of the bellows 12. The lever moves with the end of the bellows and constitutes a part of the thermo-pressure-responsive means. A resilient means, such as the spring 13, is connected to the lever 9 and counteracts the pressure exerted within the bellows. The bellows is connected by means of a pipe 7 to the chilling unit 14 of the refrigerating apparatus. The bellows is provided with a fluid having a low vapor or boiling point, and the pipe 7 terminates in a bulb or end part located in contact with the wall of the chilling unit and thus in ready heat-transferring relation thereto.

The switch 8 is connected in the circuit of an electric motor 15. The motor 15 operates a compressor 16 which draws the refrigerant gas from the chilling unit 14 and causes absorption of heat from the wall of the chilling unit and the interior of the refrigerator. The compressor 16 directs the refrigerant into the condenser 17, from whence the refrigerant liquid is directed to the chilling unit 14. As the refrigerating operation continues, the temperature lowers, and the pressure in the bellows 12 lowers. The spring 13 counteracts the pressure of the fluid in the bellows 12 to reduce its volume at the different temperatures of the fluid in the pipe 7 and correspondingly move the lever 9. The parts of the switch are so located with respect to the movable contact that the lever closes the switch when the lever reaches one point in its movement and opens the switch when the lever reaches another point. The switch is thus opened at a fixed volume of the bellows, and it is closed at another fixed volume of the bellows.

The spring 13 is connected not only to the lever 9, but also to the adjustable arm 23. The arm 23 has a lip 24 that, by reason of the pull of the spring 13, is pressed against a cam 25. The cam 25 is connected to the pointer or handle 2 which may be manually operated to rotate the cam 25 and thus displace the arm 23 with reference to the lever 9 to vary the tension of the spring 13.

The arm 23 is pivotally supported on a pin 30 that is secured to the top of the shell 1. The arm 23 is preferably channel-shaped and is connected to the spring 13 by means of a bolt 31. The bolt extends through one end of the arm and is provided with an adjustable nut 32 for calibrating or factory-adjusting the spring 13.

The cam 25 is connected to the pointer 2 by means of the pin 33. Rotation of the pointer 2 rotates the cam 25 that adjusts the position of the arm 23 and the tension of the spring 13. This inter-relationship enables the user of the refrigerator to produce desired temperature operations of the refrigerator within a limited range as indicated by the pointer 2.

In order to produce a higher or a lower temperature than that of the normal temperature range, that is, to produce a fixed defrosting temperature or a fixed temperature lower than the normal refrigerating temperature, the handle or pointer 3 of the other switch control element is operated by the operator to move the handle or pointer in one direction or the other to accomplish either defrosting or fast-freezing. Moving the pointer 3 to the defrosting position, that is, to the left, as indicated in Fig. 1, or to the fast-freezing position, that is, to the right, as shown in Fig. 1, operates to move the arm 23 from the cam 25 regardless of the position of the cam, and consequently the adjustment for the normal operating temperatures of the refrigerator will not affect the defrosting temperature nor the fast-freezing temperature.

A toggle link 38 is operatively connected to an arm 39 that is also pivotally supported on the pin 30. A spring 40 is located intermediate the arm 39 and the arm 23, having end portions that engage the parts of the arms 39 and 23. The spring operates, when the toggle link 38 is released, to return the arm 39 to a normal position relative to the arm 23. The end of the toggle link 38 is connected to a pin 42 located in the arm 39, and an adjusting screw 43 is located in the arm 23 to engage a part of the pin 42, such as a squared portion 45 of the pin and thus, the extent of the movement of the arm 23 by the arm 39 is adjusted to insure disconnection of the arm 23 from the normal refrigerating adjusting means.

One end of the toggle link 38 is fan-shaped and terminates in a sinuous edge substantially arcuate in outline that operates gear-like in its coaction with a pinion-like, oscillatable member operated by the pointer 3. The oscillatable member correspondingly oscillates the toggle link on the pin 42.

The pointer 3 is connected to a plate 49 having a slot 50. The pointer and the plate are pivotally supported by means of a sleeve 51 on the top of the shell 1. A pin 52 extends through an arcuate slot 53 formed in the top of the shell. The pin 52 is connected to a plate 54 rotatably supported on a pin 55 secured to the top of the shell 1 and a bracket 48 secured to a side wall of the shell and in cooperative relation to a pair of pin-connected plates 56 and 57 that are also rotatably supported on the pin 55. The plate 54 is located on the plate 56 and has a stud 58 that extends downwardly into an opening 59 formed in the plate 56. The opening 59 is much larger in diameter than the stud 58, and hence there is some play as between the plate 54 and the plates 56 and 57. The plates 56 and 57 are connected together and spaced from each other in parallel plane relation by means of the pins 60, 61, and 62. The sinuous edge of the flaring or fan-shaped end 63 of the toggle link 38 forms the recesses 64, 65, and 66. The recesses 64 and 66 and their edges are adapted to receive and engage the pins 61 and 60. Upon rotation of the plates 56 and 57, one or the other of the pins 60 and 61 is moved near the line of centers of the plates and the pin 42, and the plates and link 38 operate toggle-wise to move the arm 23 against the pressure of the spring 13. Thus, the pointer 3 may be moved angularly from one position to another, and the fan-shaped end part 63 of the toggle link 38 will be moved gear-wise by the pins 60 and 61. In such movement, either to the right or to the left, the edge of the recess 65 will move over the pin 55, and the pin 55 will operate as a guide for the end 63 of the toggle link as it is carried from one position to another. In one movement, the pin 60 is moved from well above to a point slightly below the line interconnecting the centers of the pin 55 and the pin 42. In the other movement, the pin 61 is moved from a point well below to a point slightly above the line of the centers of the pin 55 and the pin 42. This operates in each case to move the arm 39, which in turn moves the arm 23 outward and away from the cam 25 and thus disconnects the spring 13 from the normal refrigerator adjusting means, namely, the cam 25 and its connected handle or pointer 2.

The plate 56 is provided with engaging ears 69 and 70, and the lever 9 has a flange part 74 that is engaged on one side or the other by one or the other of the ears 69 and 70. When, therefore, the user of the refrigerator desires to defrost the chilling unit, the pointer 3 is turned to the left until the ear 69 engages the protruding flange part 74 formed on the end of the lever 9. This extends the toggle mechanism and moves the pin 61 across the line of centers of the toggle. The pressure of the ear 69 on the lever 9 coacts with the tension of the spring 13 operating through the toggle mechanism to produce a resultant counteracting pressure on the lever and the bellows 12 that varies quite in accordance to the mechanical advantage produced by the connection of the toggle link 38 and the pin-connected plates. The toggle means transmits therethrough a part of the pressure exerted by the tension of the spring 13 and cooperates with the spring 13 to press the lever 9 against the bellows 12 and produce the desired, adjusted, increased counter-acting pressure on the bellows. The increased resultant counteracting pressure causes the bellows to reduce slightly in volume and open the switch if it is not already open and to maintain the switch open until the temperature of the chilling unit rises sufficiently high to cause the volume of the bellows to increase to a point that will cause the lever 9 to close the switch. By reason of the degree of the resultant counteracting pressure occuring as the bellows approaches the fixed switch-closing volume, the temperature will be well above the normal temperature range and at a fixed predetermined defrosting temperature by the resultant counteracting pressure, when the lever breaks the toggle and closes the switch. The plates 56 and 57 and the link are snapped into their normal or neutral positions and the connection or engagement of the arm 23 with the cam 25 is restored as the mechanical means, comprising the pin-connected plates and the toggle link, is disconnected from the spring 13 and the lever 9.

If it is desired to produce fast-freezing, the pointer 3 is rotated to the right. This again causes the plate 49 to engage the pin 52 and rotate the plate 54. The stud 58 engaging the edge of the opening 59 rotates the plates 56 and 57. The pin 60 is moved across the line interconnecting the centers of the pins 55 and 42, and the toggle link 38 again moves the lever 23 away from the edge of the cam 25 until the ear 70 formed on the plate 56 engages the flange part 74 of the lever 9, but on the side to reduce the counter-pressure on the bellows produced by the spring 13, that is, to coact with the pressure of the bellows on the lever 9 towards the switch closing volume of the bellows and to a degree that accords with the mechanical advantage or power ratio of the toggle mechanism as limited by the relative location of the parts as determined by suitable stops.

The setting of the plates 56 and 57 and the toggle link 38 is limited by the lug 77 on the plate 57 that engages the adjusting screw 78 located in the bracket 48. The pressure of the spring 19 is thus divided, a part being exerted on the toggle mechanism and a part on the lever. The toggle mechanism thus transmits to the lever a part of the pressure exerted by the spring that acts counter to the part exerted directly on the lever by the spring, with the result that the counter-acting pressure on the bellows as transmitted through the lever is reduced, and the switch closes, or if the switch is closed, the switch is maintained closed until the interior pressure of the bellows permits reduction of the volume of the bellows to the switch-opening point. As the lever moves to the switch-opening point, the lever 9 moves the plates 56 and 57 until the pin 60 is moved across the line of the centers of the pins 55 and 42, and the toggle link and plates are snapped to their normal positions, which disconnects the toggle mechanism from the bellows and the spring and renders the switch subject to the setting of the adjustment cam 25 and pointer 2 as described above. Thus, by adjustments of the parts, the resultant counter-acting pressure produced on the bellows is fixed when the lever moves through the switch-opening point, which produces a predetermined "fast-freezing" temperature in the refrigerator, and the refrigerating cycles are restored to the control of the pointer 2 and cam 25 that produces the desired normal refrigerator operating temperatures.

I claim:

1. In a refrigerator control switch, a thermo-pressure responsive means for operating the switch, a resilient member for counter-acting the pressure of the pressure responsive means, adjusting means for varying the pressure of the resilient member to produce normal operating cycles between desired fixed temperature limits, mechanical means manually operable to engage the resilient member and release the resilient member from the adjusting means and to engage the pressure responsive means to decrease the counter-acting pressure on the pressure responsive means to produce definite switch opening pressure below the said normal pressure and temperature.

2. In a switch, a pressure responsive means and a resilient means for opening and closing the switch, an adjusting means for adjusting the pressures at which the switch is opened and closed, a mechanical means for releasing the control of the switch from the adjusting means and for increasing the pressure of the resilient means and operable by pressures of the resilient means to counter-act or coact with the pressure of the pressure responsive means to modify the switch opening and closing pressures to above or below the switch operating pressures produced by the adjusting means and automatically operated by the pressure responsive means to release the switch from the control of the mechanical means and restore the control of the switch to the adjusting means.

3. In a switch, in combination, a movable actuating member; a spring continuously and yieldingly affecting movement of said member; adjustable means for varying the tension of said spring between predetermined limits; a device having a normal position and being movable to either of two other positions for either increasing or decreasing the effect of the spring on the movable actuating member; said device, when moved to one of said two last mentioned positions, rendering the adjusting means ineffective; and means for rendering the device operative and non-operative.

4. In a switch, in combination, a movable actuating member; a spring for resisting movement of said member; adjustable means for varying the tension of said spring between predetermined limits; a device having a normal position and being movable to a second position for decreasing the resisting effect of the spring on the actuating member to a predetermined degree, said device, when moved to the second position, rendering the adjusting means ineffective to vary the resisting effect of the spring; and means for moving said device from one of the positions to the other.

5. In a switch, in combination, a movable actuating member; a spring for resisting movement of said member; adjustable means for varying the tension of said spring between predetermined limits; a device having a normal position and being movable to a second position for establishing a predetermined tension in the spring and for decreasing the effect of the spring on the actuating member, said device, when moved to the second position, rendering the adjusting means ineffective to vary the resisting effect of the spring; and means for moving said device from one of the positions to the other.

6. In a switch, in combination, a movable actuating member; a spring for resisting movement of said member; adjustable means for varying the tension of said spring between predetermined limits; a device having a normal position and being movable to a second position for increasing the tension of the spring to a predetermined value and for decreasing the effect of the spring on the actuating member, said device, when moved to the second position, rendering the adjusting means ineffective to vary the resisting effect of the spring; and means for moving said device from one of the positions to the other.

7. In a pressure operated switch, a switch, a pressure responsive member for operating the switch; a spring constantly urging said member in one direction; and a second member associated with said spring and being movable to a position for opposing movement of the pressure responsive member in said one direction, said spring acting to bias the second member in the said position.

8. In a pressure operated switch, a switch, a pressure responsive member for operating the switch; a spring constantly urging said member in one direction; and a second member associated with said spring and being movable to one position for opposing movement of the pressure responsive member in said one direction and movable to a second position for yieldingly urging the pressure responsive member in said one direction, said spring acting to bias the second member in either of said positions.

ESTEL C. RANEY.